United States Patent [19]

McDougal

[11] 4,298,195
[45] Nov. 3, 1981

[54] QUICK SET HYDRAULICALLY ACTUATED CLAMPING TABLE

[76] Inventor: Thomas F. McDougal, 1415 Beech La., Fairmont, W. Va. 26554

[21] Appl. No.: 158,823

[22] Filed: Jun. 12, 1980

[51] Int. Cl.³ .............................................. B23B 31/16
[52] U.S. Cl. ..................................... 269/32; 269/304; 269/305; 269/320; 269/900
[58] Field of Search ...................... 269/27, 32, 33, 900, 269/303, 304, 305, 320; 279/1 L, 1 ME, 1 S

[56] References Cited

U.S. PATENT DOCUMENTS

| | | | |
|---|---|---|---|
| 3,608,886 | 9/1971 | Greene | 269/305 |
| 4,157,819 | 6/1979 | Meyer | 269/900 |
| 4,174,847 | 11/1979 | Wiesler | 279/1 L |
| 4,222,577 | 9/1980 | Giffin | 279/1 L |
| 4,258,928 | 3/1981 | Wiesler | 279/1 L |

*Primary Examiner*—Robert C. Watson
*Attorney, Agent, or Firm*—Mason, Fenwick & Lawrence

[57] ABSTRACT

A quick set hydraulically actuated clamping table assembly including a base supporting at least one pair of companion flat horizontal platens movable toward and away from each other having apertures for variably fixing jaw pieces thereon for holding workpieces thereon of various shapes. A pair of laterally adjacent elongated slide plates are located beneath and fixed respectively to the platens for sliding guided contact with the base and have shaped cam follower recesses in adjacent confronting edges receiving a pair of semi-cylindrical bearing segment members and a pair of shaped bearings abutting flat faces of the segment members. Resiliently biased concave face bearing blocks provide bearing faces against which the convex faces of the segment members work providing a centralizing mechanism correlating movement of the slide plates to equal and opposite movement, and hydraulic piston devices at the opposite ends of the slide plates oppositely move the slide plates in directions to carry the platens through said approaching and withdrawing strokes to clamp and release the workpiece.

22 Claims, 8 Drawing Figures

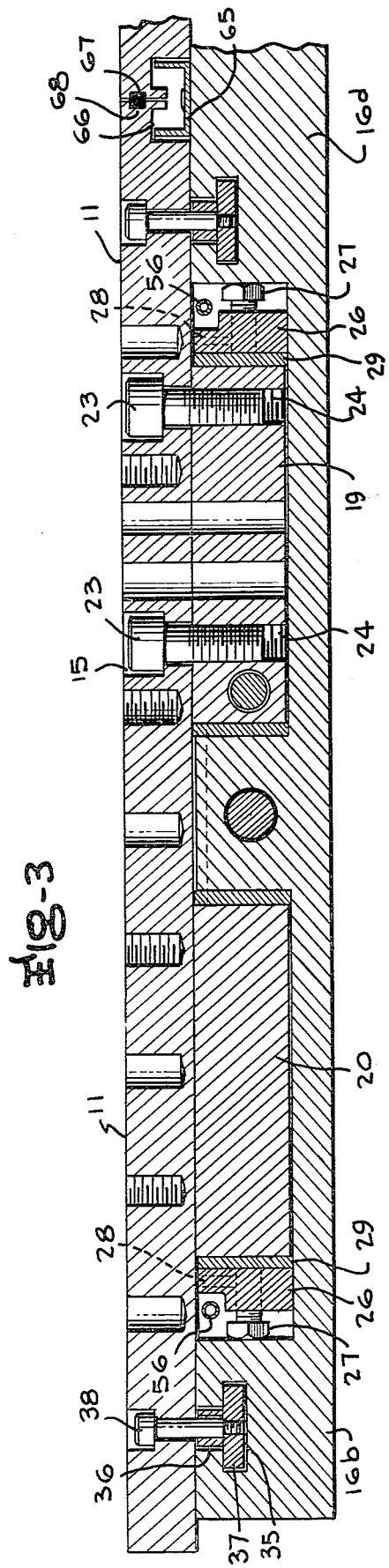
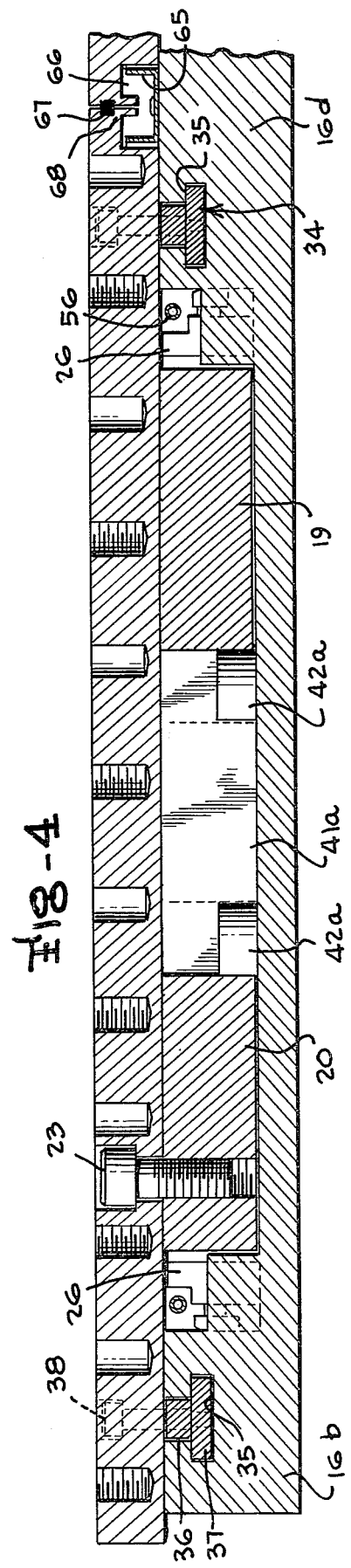

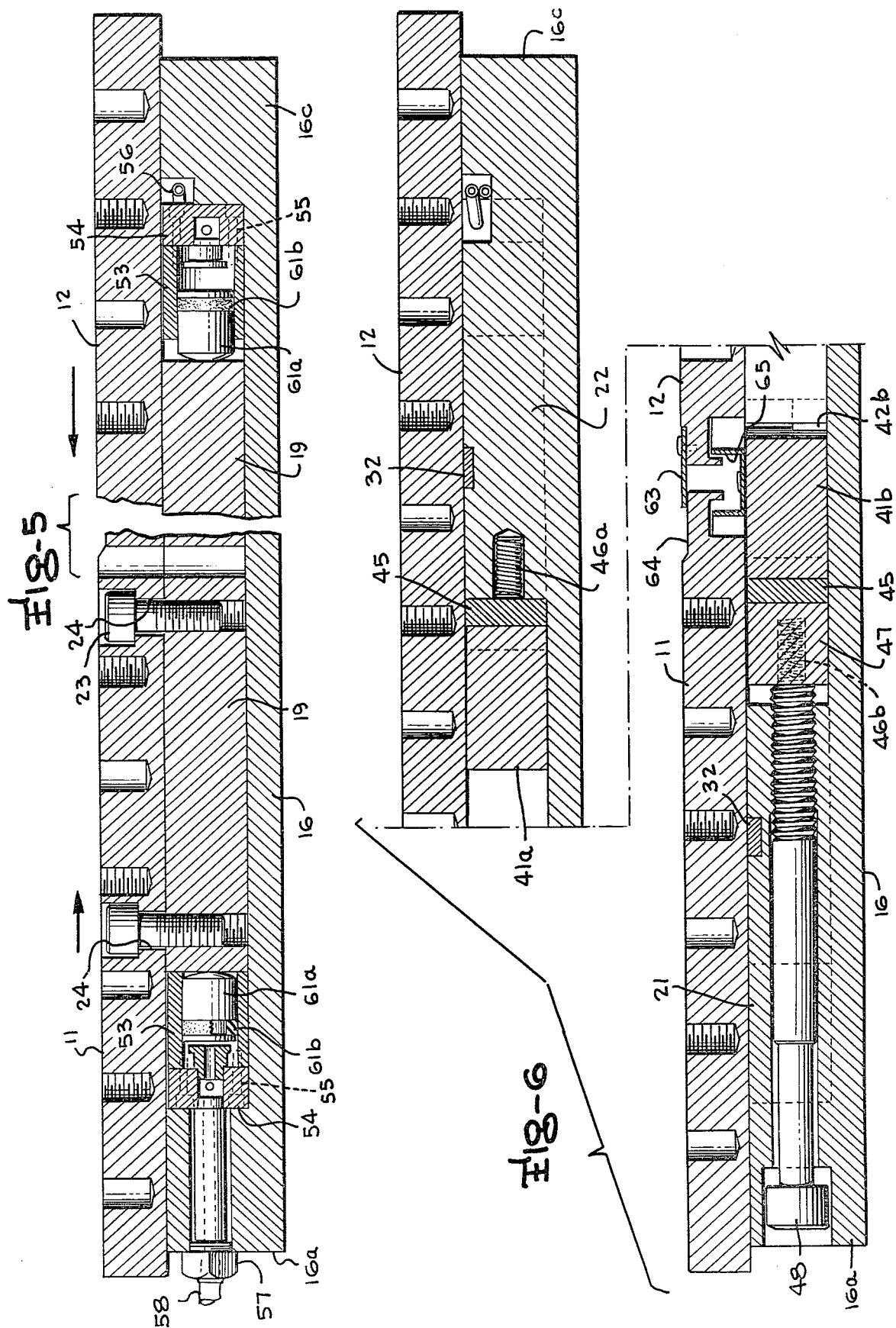

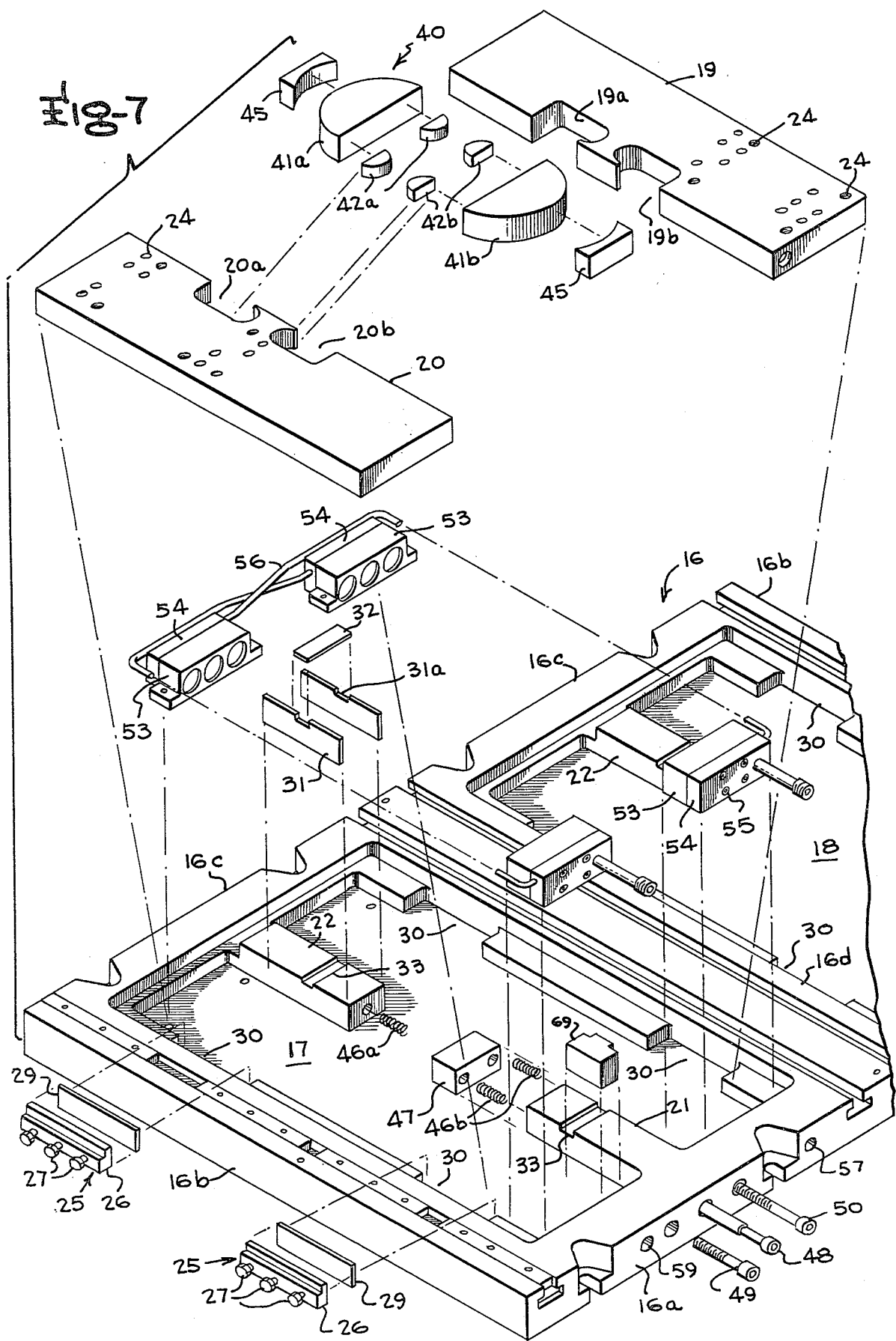

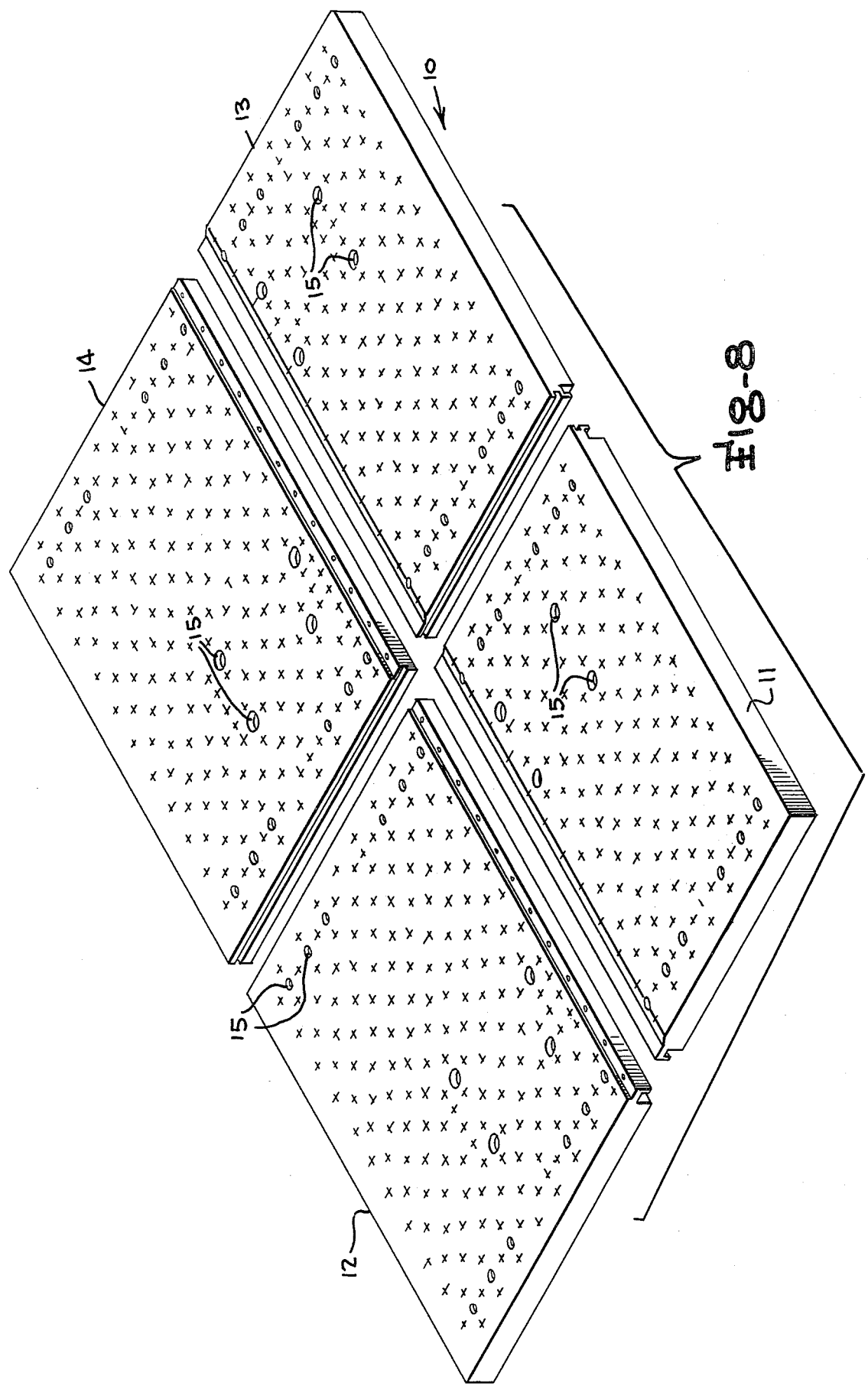

QUICK SET HYDRAULICALLY ACTUATED CLAMPING TABLE

BACKGROUND AND OBJECTS OF THE INVENTION

The present invention relates in general to a plural platen clamping table assembly for securing workpieces on the table or platen of a metal working machine, and more particularly to a clamping table assembly having plural platens provided with patterns of tapped holes and reamed holes adapted to have securing bars or blocks fixed thereto and to be quick set by hydraulic actuating means to provide any size vise up to the maximum size of the table for securing regular and irregular shaped workpieces in a desired position on a metal working machine.

Heretofore, many types of removable workpiece supporting vise or fixture assemblies have been provided to provide a predetermined workpiece positioning assembly on a metal working machine. One of the traditional problems in such workpiece positioning assemblies has been the considerable amount of so-called "set-up" time to properly position the workpiece prior to each forming operation. This problem has been particularly acute where it is desired to provide the workpiece supporting assembly with sufficient flexibility to permit it to secure in proper position irregular shaped workpieces as well as regular shaped workpieces such as cubes, rectangular solids or cylinders. Also, such workpiece positioning tables or assemblies have frequently been quite limited in the variety of sizes of workpieces which can be accommodated.

An object of the present invention, therefore, is the provision of a novel multiple platen quick set hydraulic clamping table assembly for securing workpieces on a metal working machine or the like, having drilled and threaded platens arranged in at least one pair of platens which can be hydraulically moved toward and away from each other, each providing a large rectangular area providing a wide variety of positions for mounting securing bars or blocks thereon to provide a workpiece holding vise accommodating workpieces up to the maximum size of the table. Another object of the present invention is the provision of multiple platen hydraulically actuated clamping table assembly of the type described in the preceding paragraph, wherein the securing bars or blocks may be secured in such positions that irregular shaped workpieces may be easily secured thereon.

Another object of the present invention is the provision of a novel multiple platen clamping table assembly of the type described in either of the preceding paragraphs, having a centralizing device for each relatively movable correlated pair of platens, whereby the centralizing device may be selectively engaged to effect securing of round or symmetrical workpieces with reference to their centerline, either by engagement of the outside surfaces or the inside surfaces, in the case of hollow workpieces.

Yet another object of the present invention is the provision of a novel multiple platen clamping table assembly as described in any of the preceding paragraphs, having means for locking the platens in position to enable the clamping table to be used as a an ordinary grid plate for the use of vertical clamping devices.

The clamping table assembly generally comprises a left-hand pair of drilled and threaded platens and a right-hand pair of drilled and threaded platens each tapped to receive mounting screws for supporting upright abutment bars or blocks to engage the periphery of the workpiece and secure it on the clamping table. The first or left-hand pair and second or right-hand pair of relatively movable platens are secured to slides for movement toward and away from each other, and include a centralizing device formed of semicircular bearing segments which bear upon cylindrically concave surfaces of bearing blocks and retainer blocks to coordinate approaching movement of the platens of a selected pair toward each other so that round or symmetrical pieces may be secured with reference to their centerline. Hydraulic drive means are provided arranged so that when hydraulic pressure is applied to one port, the two platens of a selected pair will be moved apart and when pressure is applied at another port they will move together in coordinating relation. In practice, a workpiece to be supported on the clamping table is placed on the platens so that it overlaps each one of at least a pair, or if necessary each one of both pairs, whereupon the abutment bars or blocks forming jaw pieces are secured to each platen, using shims with the jaws in open position interposed between the jaws and the workpiece to provide clearance when the jaws are open. When the shims are removed, the workpiece is then clamped by application of hydraulic pressure by a suitable manually operated valve to the appropriate port to move the two platens of a pair or the four platens, as the case may be, toward each other to effect quick clamping of the workpiece in proper position. Alternatively, when it may be suitable to merely have the rear platen move forwardly without movement of the front platen toward the rear, means are provided for adjusting the centralizing mechanism to allow movement of the bearings without transfer of force which would coordinate the movement of the two platens relative to each other, and hydraulic controls are operated to supply hydraulic pressure to the rear platen only.

Other objects, advantages and capabilities of the invention will become apparent from the following detailed description, taken in conjunction with the accompanying drawings illustrating a preferred embodiment of the invention.

BRIEF DESCRIPTION OF THE FIGURES

FIGS. 3 and 4 are vertical transverse section views through portions of the control and coordinating and supporting structure for the left-hand pair of platens, taken along the lines 3—3 and 4—4 of FIG. 1;

FIG. 5 is a fore-and-aft fragmentary vertical section view through portions of the support structure for the left-hand pair of platens, taken along the lines 5—5 of FIG. 2;

FIG. 6 is a fore-and-aft vertical sectional view taken substantially along the midplane of the left-hand pair of platens through the centralizing structure therefore, taken along the lines 6—6 of FIG. 2;

FIG. 7 is a fragmentary exploded perspective view of the base, platen supporting slides, centralizing structure, hydraulic cylinder blocks, and related guide structure for the left-hand platen pair and part of the right-hand platen pair of the clamping table assembly; and FIG. 8 is a pespective view of the four platens of the clamping table arranged adjacent each other without the associated platen supporting and moving structure.

DETAILED DESCRIPTION OF A PREFERRED EMBODIMENT

Figure 1:
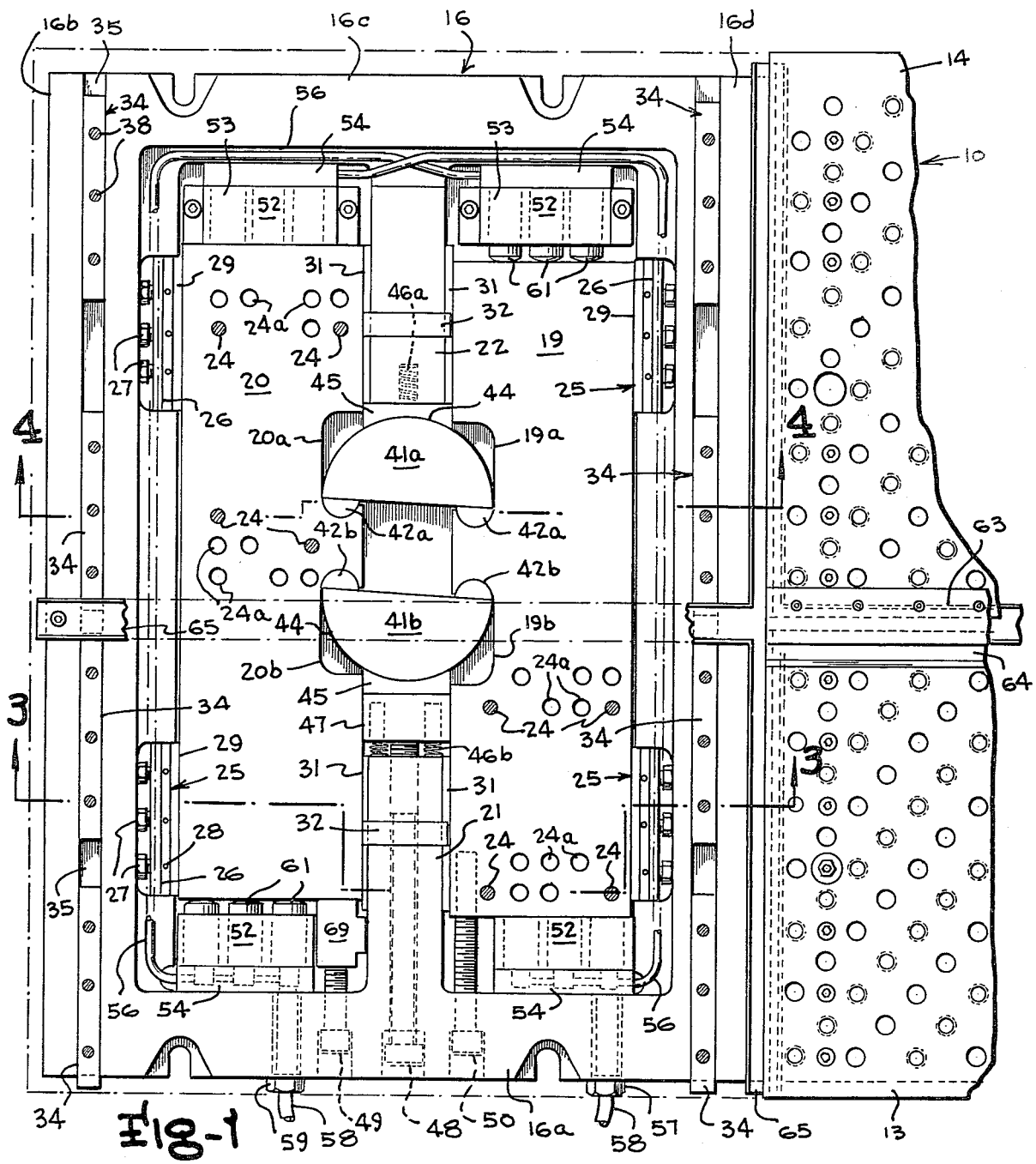
FIG. 1 is a fragmentary top plan view of a multi-platen clamping table assembly embodying the present invention, showing part of the relatively convergently and divergently movable platens for the right-hand pair of platens and showing the underlying structure for the pair of left-hand platens with the left-hand platens removed.
Figure 2:
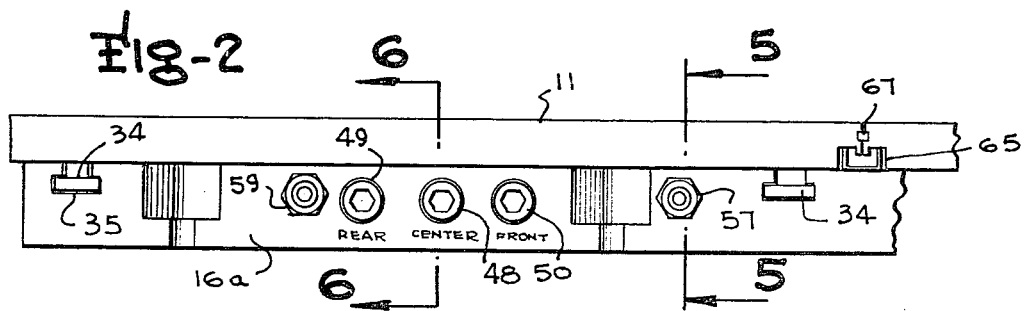
FIG. 2 is a front elevation view of the clamping table assembly shown in FIG. 1.

Referring to the drawings, wherein like reference characters designate corresponding parts throughout the several Figures, the multiple platen clamping table assembly of the present invention, in the preferred embodiment herein illustrated, generally indicated by the reference character 10, comprises an array of four relatively movable peforated flat platens 11, 12, 13 and 14, each having a large number of drilled holes 15, some of which, indicated at 15', are tapped holes in the respective platens, the platens being arranged in two laterally spaced pairs overlying a generally rectangular base frame structure 16. As will be apparent from FIGS. 8 and 1, the four platens form a generally rectangular clamping table in which the front and rear platens 11 and 12 form a left-hand pair and the platens 13 and 14 form a right-hand pair arranged in side-by-side relation. The base frame structure 16, as best shown in FIGS. 1 and 7, forms a pair of laterally spaced side-by-side rectangular loop frames having front frame sections 16a, outer side frame sections 16b along the opposite sides of the frame structure 16, rear frame sections 16c, and a center divider strip section 16d. These frame sections 16a–16b thus subdivide the frame section 16 into two side-by-side rectangular frame loops surrounding center wells 17,18.

Located within each of the center wells 17 and 18 of the two base frame loops are a pair of laterally spaced elongated slide plates 19,20 to be connected to (and supported by) the respective front and rear platens 11,12 or 13,14 of the left-hand pair or right-hand pair, and designed to move in fore-and-aft rectilinear paths along axes paralleling the fore-and-aft center axis of the divider strip section 16d to move the associated pair of platens 11,12 or 13,14 toward and away from each other through a limited range of movement. The slide plates 19,20 are of generally rectangular configuration in top plan, elongated in the fore-and-aft direction, having shaped cut-outs 19a,19b and 20a,20b in their mutually adjacent confronting edges to cooperate with a centerlizing system, and are slidably guided in the wells 17 or 18 between bearing plate assemblies, later described, along the confronting surface portions of side frame sections 16b and divider strip section 16d and a pair of rearwardly and forwardly extending center projections 21,22 projecting into the associated center well 17 or 18. The front left-hand platen 11 is fixed to the slide plate 19 in the center well 17 by suitable anchoring fasteners, such as threaded anchor bolts 23 extending through untapped, countersunk holes in the platen 11, for example at four spaced-apart locations and into threaded holes, as indicated at 24 in the slide plate 19, and also by tightly fitted pins in reamed holes 24a, while companion rearmost left-hand platen 12 is similarly anchored to the slide plate 20 by anchor bolts 23 extending through unthreaded openings 15 in the platen 11 and into threaded holes 24 in the slide plate 20.

The companion slides 19 and 20 of each of the two pair of slide plates are precisely guided for rectilinear fore-and aft movement, with their companion platens anchored thereto, by a pair of outer edge guiding bearing plate assemblies 25 spaced along the two outer side frame sections 16b and along each side of the medial divider strip section 16d to bear against the respective outer edges of the companion pair of slide plates 19 and 20. These four bearing plate assemblies associated with each well 17 and 18 are of the like construction and each comprise an elongated gib 26 having headed adjustment bolts 27 and set screws 28 therein, and a flat rectangular elongated bearing plate 29, disposed in the respective cut-outs 30 therefor. As best shown in FIG. 3, the three headed bolts 27 are threaded into tapped through openings extending along parallel horizontal axes in the thicker lower body portions of the gibs 26 and are releasably fixed in their adjusted positions by the associated three set screws 28 accessible from above, while the flat inwardly facing surface of the gib 26 bears against a flat rectangular bearing plate 29 to slidably bear against the uninterrupted straight outer edge of the associated slide plate 19 or 20.

Flat rectangular bearing plates 31 are also provided along the opposite sides of the center projections 21,22 in each well 17,18 held against movement with the slide plates 19,20 by a key 32 interfitting in a groove 33 transversely spanning the respective center projections 21,22 and fitting into notches 31a in the upper edges of the bearing plates 31.

The companion pair of platens 11,12 or 13,14 are also guided in the desired rectilinear fore-and-aft path of movement and retained against the base frame structure 16 on which they slide by inverted T-shaped spacer and retainer strip assemblies 34 spaced inwardly from and near the opposite lateral edges of the platens to track in elongated guideways 35 of corresponding inverted T-shaped cross-section. The spacer and retainer strip assemblies 34 in the illustrated embodiment are each made up of a substantially rectangular cross-section spacer bar member 36 having an untapped bolt hole therethrough and an associated elongated rectangular cross-section retainer plate portion 37 of greater width than the spacer bar section 36, provided with tapped openings registering with the openings in the spacer bar 36, and assembled together by bolts 38 or similar fasteners extending through holes 15 in the associated platen 11,12 or 13,14 to assemble the spacer bar 36 and retainer plate portion 37 and associated platen together as a rigid assembly. As shown in FIG 1, in the illustrated embodiment two such guide strip assemblies 34 made up of the spacer portion 36 and retainer portion 37 are provided along each of the opposite side edges of each platen and fixed to their associated platen to track in the guideways 35.

Coordination of the movement of the two platens of a companion pair, such as platens 11,12 or 13,14 by coordinating the movement of their respective slide plates 19 and 20 to cause the movement of the slide plates and of their associated platens to be equal and opposite, is provided by a centering assembly, indicated generally by the reference character 40 between the two companion slide plates. This centering assembly 40 comprises a pair of semicylindrical segment members 41a,41b working in the shaped cut-outs 19a,19b and 20a,20b, each having associated small diameter semicylindrical bearing members 42a,42b whose flat vertical faces abut the flat vertical faces of the segment members 41a,41b. The convex arcuate faces 44 of the respective segment members 41a,41b are in sliding abutment with similarly curved concave arcuate faces of bearing members 45, the rearmost one of which is positioned against the end face of the rearmost center projection 22 by spring 46a, and the front bearing member 45 being resiliently urged against its companion segment member 41b by a pair of springs 46b in a spring retainer block 47. The centering assembly is placed in the "Centering Mode" by a long screw 48 having a nonround socket in its forwardmost end exposed to access from the front of the base forming a "Center Lock" screw. To place the system in the "Centering Mode, " this "Center Lock" screw 48 is turned clockwise until firmly seated, causing the semicylindrical segment members 41a,41b and bearing members 42a,42b to move angularly within their associated shaped cut-outs 19a,19b and 20a,20b of the slide plates 19,20 to correlate motion between the two slide plates so that the two companion slide plates 19,20 and their associated platens 11,12 or 13,14 to move equal amounts and in opposite directions responsive to movement of either slide plate.

In addition to turning the screw 48 marked "Center Lock" clockwise until firmly seated to place the system in the "Centering Mode", two additional screws 49 and 50, marked "Rear Lock" and "Front Lock" must also be turned counterclockwise until flush with this front surface of the base frame structure 16, cooperated with other structure as later described.

The companion pair of platens, such as platens 11,12 and their associated companion slides 19,20, are quickly driven between release and workpiece clamping position by fluid pressure piston systems, such as hydraulic piston assemblies, working against the opposite ends of the respective slides 19,20. In the illustrated embodiment, each respective companion pair of slide plates 19,20 are activated by four hydraulic piston assemblies, indicated generally by the reference character 52, each of which are of substantially identical construction. These hydraulic piston assemblies 52 each comprise a plural piston housing block 53 and a hydraulic line coupler block 54 assembled together, for example by four assembly bolts 55, the coupler block 54 having side entry ports for connection to hydraulic lines 56 interconnecting the four piston assemblies 52, and running for example in the space provided by the kerfs in the upper outer corners of the gib blocks 26 of the bearing plate assemblies 25, as shown for example in FIGS. 3 and 4, and running rearwardly of the piston assemblies 52 at the rearmost ends of the slide plates 19,20. In the illustrated example, the hydraulic lines 56 interconnect the hydraulic piston assembly 52 at the rear of slide plate 20 with the piston assembly 52 at the front of the slide plate 19 which is then connected through hydraulic line connection port 57 at the front of the base structure 16 for connection through a hydraulic fluid conduit 58 to the hydraulic system control console or center, and the piston assembly 52 at the rear of slide plate 19 is interconnected with the piston assembly 52 at the front of slide plate 20 which connects through hydraulic line port 59 and another hydraulic fluid conduit 58 connected to the control console or center for correspondingly activating these interrelated pairs of piston assemblies.

The piston housing blocks 53 are drilled to provide three cylindrical piston cavities 60 in which the cylindrical pistons 61 work against the confronting ends of the slide plates 19,20. For example, the pistons 61 may take the form of cylindrical piston bodies 61a slidable in and cross-sectionally conforming substantially to the cross-section of, the piston cavities 60, and having resilient piston cups 61b, inwardly abutting the fluid from the conduit system 56 and coupler block passages work.

It will also be noted that the respective companion pairs of platens 11,12 and 13,14 are provided with rigid metal guard strips 63 at the confronting edges of the respective pairs, secured, for example, to the rearmost platens 12 and 14 in a shallow kerf or groove at the upper front corners of these two platens by suitable headed fasteners whose heads are flushed with the upper surface of the guards, and which lap over the corresponding rearmost edge portions of the front companion platens 11,13 in recesses 64 sized in accordance with the thickness of the guards 63 and the extent of relative movement of the platens to receive the forwardly projecting edge portions of the guard strip and permit the top surface of the guard strip to remain flush with the top surfaces of the platens. Additionally, upwardly facing oil (or coolant) receiving and conveying channels or throughs 65 disposed in a cross-shaped pattern underlying the adjacent edge portions of the four platens 11–14 are fixed to the base frame structure 16 and are received in suitably shaped recesses 66 and a sealing rod of small diameter, indicated at 67, is provided in confronting grooves 68 in the adjacent confronting side edges of the companion pair of platens 11,12 and the pair 13,14, as best shown in FIGS. 3 and 4, to resist passage of contaminating filings and the like downwardly between the edges of these pairs of platens.

In the use of the apparatus, a workpiece is placed on the platens 11,12 13 and 14 so that it overlaps each one. Then jaw pieces or abutment pieces of conventional configuration are secured to each platen by anchoring bolts extending through the jaw pieces and into tapped openings in the platens. The proper location for the jaw pieces relative to the workpiece is determined by using shims between the jaw pieces and the workpiece to provide clearance when the jaws are open. This is done with the jaw pieces in open position. When the shims are removed, the workpiece can then be clamped by hydraulic pressure applied by a suitable manually operated valve assembly, which activates the hydraulic piston assemblies 52 to shift the slide plates 19,20 and the platens carried thereby so as to bring the jaw pieces anchored on the platens into tight-holding contact with the workpiece. More specifically, assuming it is desired to place the clamping table in the "Centering Mode" the control screw 49, marked "Rear Lock," is released by turning it counterclockwise until it is flush with the front surface of the base structure 16, and the control screw 50 marked "Front Lock" is released in a similar manner, and the control screw marked "Center Lock" is turned clockwise until it is firmly seated. This releasing of the rear lock screw 49, which withdraws it forwardly permitting movement of the spacer block 69 between it and the front edge of the left-hand slide plate 20, and the releasing withdrawal of the front lock control screw 50 which in its rearmost position abuts and locks the front end of the companion slide plate 19, releases the slide plates 20 and 19 for reciprocative fore-and-aft movement, and the tightening of the center lock screw 48 positions the bearing members 45 to provide stationary concave bearing surfaces working with the convex surfaces of the semicylindrical bearing segment members 41a,41b so as to maintain the movement of the two companion slide plates 19,20 correlated in equal and opposite direction.

Thus, assuming the jaw pieces to have been assembled on the platens, using shims between the jaws and the workpiece to provide clearance when the jaws are open, and assuming the shims have now been removed, application of hydraulic pressure to the hydraulic fluid supply port 57 applies hydraulic pressure to the interconnected hydraulic piston assemblies 52 at the front of slide plate 19 and at the rear of slide plate 20, causing them to move equally and in opposite directions respectively toward the rear and front, and thus causing their associated platens 11 and 12 to converge toward each other to bring the jaw pieces into clamping and holding relation with the workpiece. When it is desired to release the workpiece, hydraulic pressure is applied to the other hydraulic conduit connection port 59 while the port 57 is connected through the control valve to the return or reservoir portion of the hydraulic system, applying hydraulic pressure to the piston assemblies 52 adjacent the front end of the slide plate 20 and the rear end of the slide plate 19, and causing these slide plates to move respectively toward the rear and front to produce relative withdrawing movement of their associated platens 12,11 and thus retract the jaw pieces on these platens from clamping relation with the workpiece.

It is apparent that with this arrangement, it is possible to clamp a large circular piece using all platens, although positioning repeatability would not necessary be accurately maintained. However, with long straight pieces, it is practical to clamp them with both sets of platens simultaneously. Hollow workpieces such as a ring may be clamped internallly in a manner similar to clamping of the circular or cylindrical workpieces.

In an alternate form of operation, it may be desired to merely have the rear platen 12 or 14 move forwardly without corresponding equal and opposite movement of the associated front platen 11 or 13 toward the rear. When this mode of operation is desired, the center lock screw 50 is rotated counterclockwise to withdraw it from engagement with the spring retaining block 47, whereby movement of the semicylindrical bearing segment members 41a,41b is allowed without transfer of force from one slide plate 19 to the companion slide plate 20, and the hydraulic circuit controls are operated to supply piston extending pressure only to the piston assembly 52 engaging the rear end of the slide plate 19.

It will be apparent, of course, that only a two platen clamping table arrangement may be provided, having the structure associated with the platens 11 and 12 located to the left of the separation between those platens and platens 13 and 14 in FIG. 1, providing the same operational characteristics and controls but providing a smaller area clamping table assembly.

I claim:

1. A quick set hydraulically actuated clamping table assembly, comprising a rigid base structure, at least one pair of companion flat platens supported closely adjacent each other in a common horizontal plane on said base for movement toward and away from each other having apertures for variably fixing jaw pieces thereon for holding workpieces thereon of various shapes, interfitting guide means on said platens and base confining relative movement of the platens to rectilinear approaching and withdrawing strokes along a reference axis, a pair of laterally adjacent elongated slide plates beneath said platens fixed respectively to an associated platen movable reciprocatively in sliding guided contact with the base parallel to said axis and having shaped cam follower recesses in adjacent confronting edges of the slide plates, a pair of semi-cylindrical bearing segment members located between said slide plates each having a flat diametric face and a convex face and having corner convex portions adjoining the diametric face located in a pair of the cam follower recesses of said slide plates, a pair of shaped bearings abutting the flat diametric faces of said segment members and working in said cam follower recesses, and resiliently biased concave face bearing blocks spaced in a direction paralleling said axis between said slide plate providing bearing faces against which the convex faces of said segment members work providing a centralizing mechanism correlating movement of the slide plates to equal and opposite movement, and hydraulic piston devices at the opposite ends of each of said slide plates interconnected to oppositely move said slide plates parallel to said axis in directions to carry the platens through said approaching and withdrawing strokes to clamp and release the workpiece.

2. A clamping table assembly as defined in claim 1, wherein said shaped bearings are semi-cylindrical bearings of smaller diameter than said bearing segment members having flat faces working against the flat faces of said bearing segment members.

3. A clamping table assembly as defined in claim 1, wherein said shaped bearings are semi-cylindrical bearings of smaller diameter than said bearing segment members having flat faces working against the flat faces of said bearing segment members and having convex faces working in concavely shaped portions of said cam follower recess.

4. A clamping table assembly as defined in claim 1, wherein said shaped bearings are semi-cylindrical bearings of smaller diameter than said bearing segment members having flat faces working against the flat faces of said bearing segment members and having convex faces working in concavely shaped portions of said cam follower recess curving along paths of the same radius of said last-mentioned convex faces.

5. A clamping table assembly as defined in claim 1, wherein said base structure is a rigid rectangular closed loop frame defining a well for receiving said slide plates, piston devices and bearing segments, bearings and bearing blocks therein.

6. A clamp table assembly as defined in claim 2, wherein said base structure is a rigid rectangular closed loop frame defining a well for receiving said slide plates, piston devices and bearing segments, bearings and bearing blocks therein.

7. A clamping table assembly as defined in claim 4, wherein said base structure is a rigid rectangular closed loop frame defining a well for receiving said slide plates, piston devices and bearing segments, bearings and bearing blocks therein.

8. A clamping table assembly as defined in claim 1, wherein said base structure is a rigid rectangular closed loop frame defining a well for receiving said slide plates, piston devices and bearing segments, bearings and bearing blocks therein and having a flat horizontal top surface supporting said platens provided with inverted T-section guideways therein paralleling said axis, said platens having correspondingly cross-sectional elongated guide rib members depending therefrom into said guideways to limit platen movement to directions paralleling said axis.

9. A clamping table assembly as defined in claim 2, wherein said base structure is a rigid rectangular closed loop frame defining a well for receiving said slide plates, piston devices and bearing segments, bearings and bearing blocks therein and having a flat horizontal top surface supporting said platens provided with inverted T-section guideways therein paralleling said axis, said platens having correspondingly cross-sectional elongated guide rib members depending therefrom into said guideways to limit platen movement to direction paralleling said axis.

10. A clamping table assembly as defined in claim 4, wherein said base structure is a rigid rectangular closed loop frame defining a well for receiving said slide plates, piston devices and bearing segments, bearings and bearing blocks therein and having a flat horizontal top surface supporting said platens provided with inverted T-section guideways therein paralleling said axis, said platens having correspondingly cross-sectional elongated guide rib members depending therefrom into said guideways to limit platen movement to directions paralleling said axis.

11. A clamping table assembly as defined in claim 1, including a center lock screw threaded in said base and movable between active and release positions to condition said concave face bearing blocks to correlate movement of the slide plates by said centralizing mechanism and to accommodate movement of said bearing blocks disabling such slide plate movement correlation.

12. A clamping table assembly as defined in claim 2, including a center lock screw threaded in said base and movable between active and release positions to condition said concave face bearing blocks to correlate movement of the slide plates by said centralizing mechanism and to accommodate movement of said bearing blocks disabling such slide plate movement correlation.

13. A clamping table assembly as defined in claim 4, including a center lock screw threaded in said base and movable between active and release positions to condition said concave face bearing blocks to correlate movement of the slide plates by said centralizing mechanism and to accommodate movement of said bearing blocks disabling such slide plate movement correlation.

14. A clamping table assembly as defined in claim 5, including a center lock screw threaded in said base and movable between active and release positions to condition said concave face bearing blocks to correlate movement of the slide plates by said centralizing mechanism and to accommodate movement of said bearing blocks disabling such slide plate movement correlation.

15. A clamping table assembly as defined in claim 11, including first direction and second direction lock screws threaded in said base and movable between lock and release positions and having end portions coactive with said slide plates to selectly block movement of the slide plates and to release the slide plates for movement responsive to the piston devices and centralizing mechanism.

16. A clamping table assembly as defined in claim 12, including first direction and second direction lock screws threaded in said base and movable between lock and release positions and having end portions coactive with said slide plates to selectly block movement of the slide plates and to release the slide plates for movement responsive to the piston devices and centralizing mechanism.

17. A clamping table assembly as defined in claim 13, including first direction and second direction lock screws threaded in said base and movable between lock and release positions and having end portions coactive with said slide plates to selectly block movement of the slide plates and to release the slide plates for movement responsive to the piston devices and centralizing mechanism.

18. A clamping table assembly as defined in claim 1, including a second pair of said platens and associated slide plates and centralizing mechanism and piston devices arranged alongside the first-mentioned pair of platens supported on the same base structure forming with the first-mentioned plates a four-platen array of laterally spaced, closely adjacent companion pairs of rectilinear reciprocative platens movable along front-to-rear axes.

19. A clamping table assembly as defined in claim 2, including a second pair of said platens and associated slide plates and centralizing mechanism and piston devices arranged alongside the first-mentioned pair of platens supported on the same base structure forming with the first-mentioned plates a four-platen array of laterally spaced, closely adjacent companion pairs of rectilinear reciprocative platens movable along front-to-rear axes.

20. A clamping table assembly as defined in claim 4, including a second pair of said platens and associated slide plates and centralizing mechanism and piston devices arranged alongside the first-mentioned pair of platens supported on the same base structure forming with the first-mentioned plates a four-platen array of laterally spaced, closely adjacent companion pairs of rectilinear reciprocative platens movable along front-to-rear axes.

21. A clamping table assembly as defined in claim 14, including a second pair of said platens and associated slide plates and centralizing mechanism and piston devices arranged alongside the first-mentioned pair of platens supported on the same base structure forming with the first-mentioned plates a four-platen array of laterally spaced, closely adjacent companion pairs of rectilinear reciprocative platens movable along front-to-rear axes.

22. A clamping table assembly as defined in claim 17, including a second pair of said platens and associated slide plates and centralizing mechanism and piston devices arranged alongside the first-mentioned pair of platens supported on the same base structure forming with the first-mentioned plates a four-platen array of laterally spaced, closely adjacent companion pairs of rectilinear reciprocative platens movable along front-to-rear axes.

* * * * *